United States Patent [19]
Talbert

[11] Patent Number: 5,320,128
[45] Date of Patent: Jun. 14, 1994

[54] CHLORINATOR WITH REDUCED NUMBER OF COMPONENTS

[75] Inventor: Christian D. Talbert, Jensen Beach, Fla.

[73] Assignee: Chlorinators Incorporated, Palm City, Fla.

[21] Appl. No.: 974,716

[22] Filed: Nov. 12, 1992

[51] Int. Cl.[5] .............................................. G05D 7/01
[52] U.S. Cl. .................... 137/116.5; 137/507; 137/510; 137/907
[58] Field of Search ............... 137/507, 510, 116.5, 137/907, 895

[56] References Cited

U.S. PATENT DOCUMENTS

| | | | |
|---|---|---|---|
| 1,507,073 | 9/1924 | Lewis | 137/510 X |
| 2,258,485 | 10/1941 | Everson | 137/510 |
| 2,343,146 | 2/1944 | Jenkins | 137/907 X |
| 2,787,280 | 4/1957 | Arpin | 137/510 X |
| 3,194,254 | 7/1965 | Zmek | 137/895 X |
| 3,220,430 | 11/1965 | Haskett | 137/895 X |
| 3,433,255 | 3/1969 | Cubberley et al. | 137/510 |
| 3,472,264 | 10/1969 | Petry | 137/510 X |
| 3,604,445 | 9/1971 | Jordan | 137/895 X |
| 4,655,246 | 4/1987 | Phlipot et al. | 137/505.25 X |
| 4,867,413 | 9/1989 | Tessler | 251/304 |
| 4,887,742 | 12/1989 | Roethel et al. | 222/153 |
| 4,993,684 | 2/1991 | Prina | 251/367 |
| 5,046,701 | 9/1991 | Barber | 251/129.02 |
| 5,083,546 | 1/1992 | Detweiler et al. | 137/907 |

Primary Examiner—Stephen M. Hepperle
Attorney, Agent, or Firm—Oltman and Flynn

[57] ABSTRACT

According to the invention there is provided a gas chlorinator with reduced number of components, having a chlorinator housing consisting of a front and a back body forming an interior cavity, a diaphragm assembly disposed between the front and back body dividing the cavity into a front chamber and a back chamber, a chlorine inlet in the back body connecting the back chamber with a chlorine source, a chlorine flow valve in the inlet in operative engagement with the diaphragm assembly for controlling flow of chlorine into the back chamber, a chlorine outlet connecting the back chamber with a vacuum source for activating the diaphragm assembly to supply chlorine to the vacuum source via the chlorine inlet and the flow valve. According to a further feature, the gas chlorinator has matching screw threads formed in the front and back body for threadedly joining the front and back body.

6 Claims, 6 Drawing Sheets

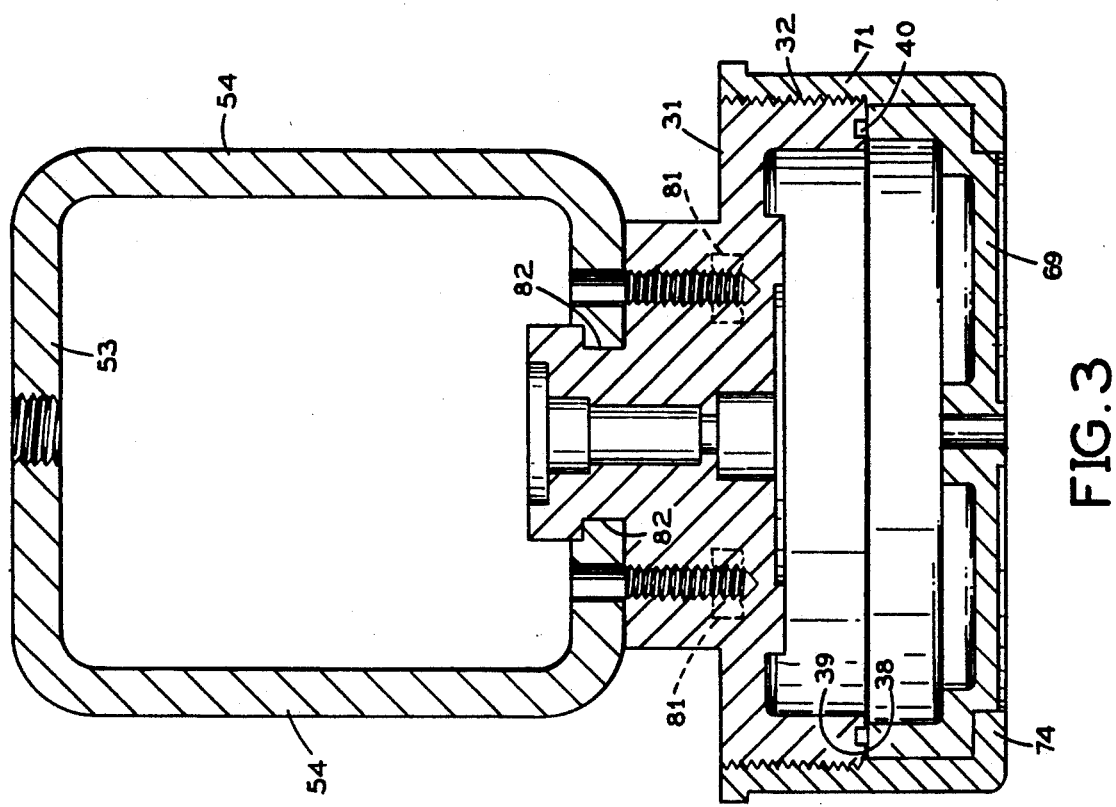
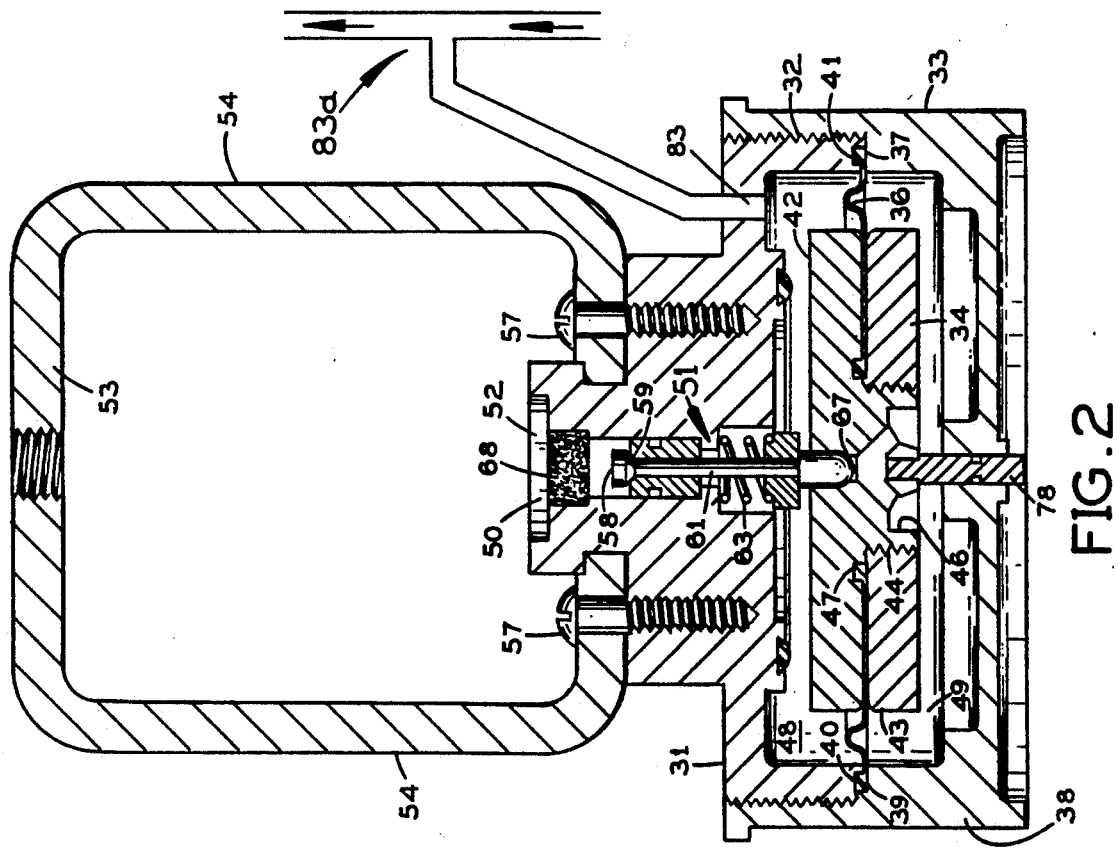

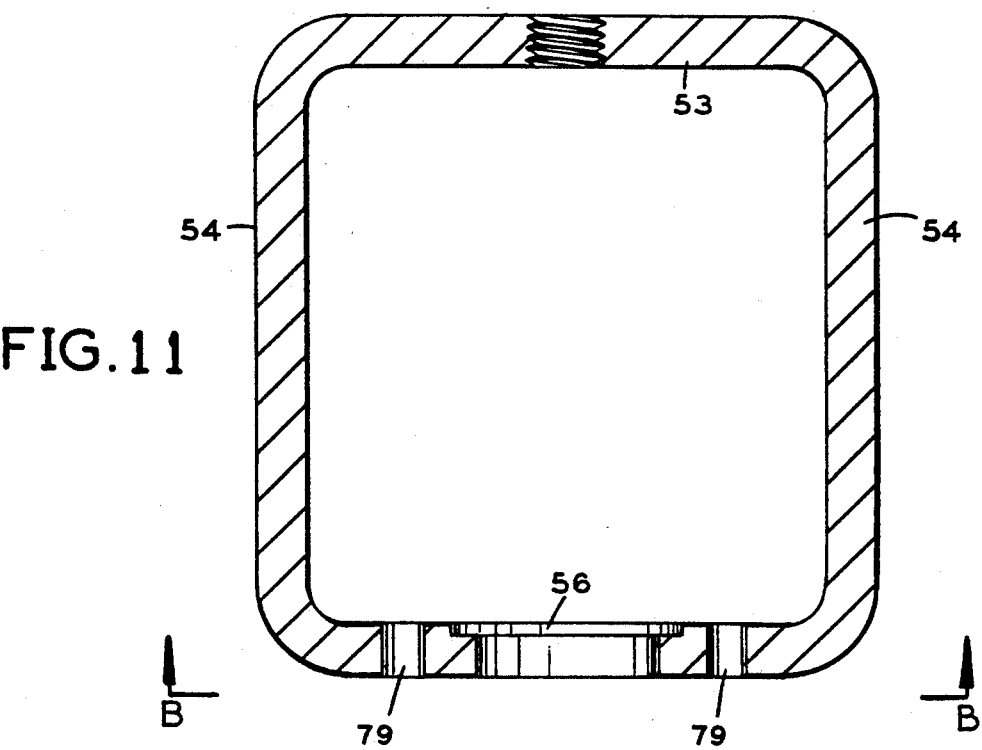
FIG.11
FIG.12
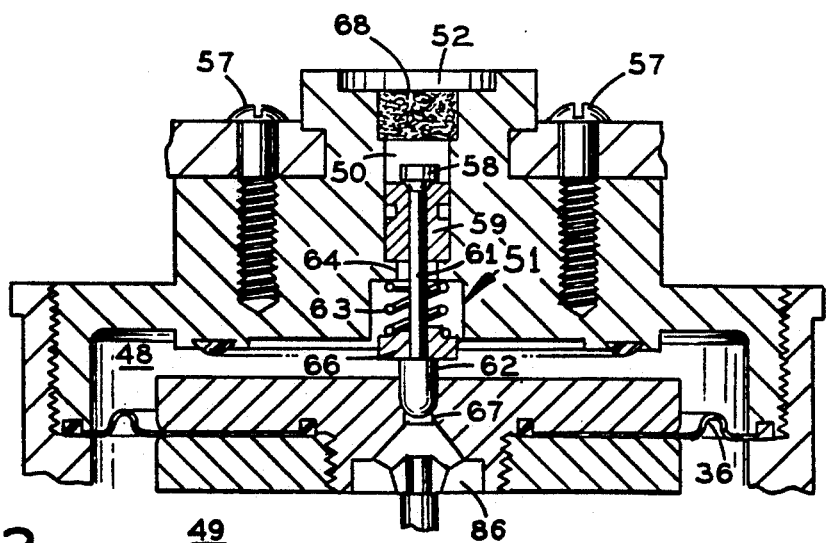
FIG.13

CHLORINATOR WITH REDUCED NUMBER OF COMPONENTS

The invention relates to gas injectors as used in water treatment, and more particularly to a gas injector for chlorine and sulfur dioxide gas having a construction requiring a reduced number of components.

BACKGROUND AND PRIOR ART

In water treatment plants it is common practice to inject various gases, in particular chlorine gas ($Cl_2$) into the water, which serves to kill bacteria and destroy other impurities in the water which may pose a health hazard to those who use such water. It is also customary to inject sulfur dioxide ($SO_3$) into the water after it has been treated with chlorine to again remove chlorine residues from the water. Since these gases are highly corrosive it is important that devices used in contact with these gases are corrosion resistant. It follows that the devices used in handling of corrosive gases such as valves, conduits, fittings, etc. should have a construction with the fewest number of parts to insure high reliability and as few seams as possible that may form leaks.

The prior art is a chlorinating and sulfunating valve currently being manufactured by the assignee of the present application, which has long been used in the gas injecting field.

Applicant has, however, developed a new version of the chlorinating and sulfunating valve which has a construction that further improves the valve of the known construction in that it involves fewer parts, with fewer seams and fewer seals for the seams, and is altogether of a less complicated construction, leading to a valve of still greater reliability and potentially lower cost.

In the following, the valve is called a "chlorinating valve", but it is to be understood that this term also includes the use of the valve for injection of other gases, such as sulfur dioxide and the like.

SUMMARY OF THE INVENTION

According to the invention there is provided a gas chlorinator comprising a chlorinator housing consisting of a front and a back body forming an interior cavity, a diaphragm assembly disposed between the front and back body dividing the cavity into a front chamber and a back chamber, a chlorine inlet in the back body connecting the back chamber with a chlorine source, a chlorine flow valve in the inlet in operative engagement with the diaphragm assembly for controlling flow of chlorine into the back chamber, a chlorine outlet connecting the back chamber with a vacuum source for activating the diaphragm assembly to supply chlorine to the vacuum source via the chlorine inlet and the flow valve.

According to a further feature, the gas chlorinator has matching screw threads formed in the front and back body for threadedly joining the front and back body, and opposite facing shoulders respectively formed in the front and back body, wherein the diaphragm assembly has a diaphragm having a perimeter flange disposed between the opposite facing shoulders.

According to a further feature a first groove is formed in the one of the shoulders in the back body, and a first O-ring is disposed in the first groove for gastightly sealing the back chamber, and in the diaphragm assembly a first and second opposite diaphragm plate is disposed on opposite sides of the diaphragm, and screw thread means are formed in the first and second diaphragm plate for threadedly joining the diaphragm plates and clamping the diaphragm between the diaphragm plates, and furthermore the first diaphragm plate is disposed in the back chamber, and the second diaphragm plate is disposed in the front chamber, a hole is formed in the diaphragm, and including in the screw thread means a threaded extension extending from one diaphragm plate through the hole in the diaphragm into a matching threaded hole in the other diaphragm plate, and the first diaphragm plate has an inward facing groove facing the second diaphragm plate, and a second O-ring disposed in the inward facing groove for sealing the back chamber.

According to still another feature, the gas chlorinator may include a clamping ring having an axially extending flange having inside screw threads formed therein, and a radially inward extending flange, the back body having outside screw threads matching the inside screw threads in the clamping ring for threadedly clamping the back body to the front body.

The chlorine flow valve includes advantageously a valve stem, a fixed valve head connected to one end of the valve stem, a detachable valve head releasably attached to the other end of the valve stem, a valve washer on the valve stem, a helical compression spring on the valve having a distal end urging the valve washer against the detachable valve head and a rear end, an outward facing valve seat in the chlorine inlet in engagement with the fixed valve head, an inside flange in the chlorine inlet having an inward facing flange in engagement with the near end of the compression spring for urging the fixed valve head against the valve seat.

The chlorinator can furthermore include a one-piece rectangular cross-section yoke for securing the chlorinator to a chlorine cylinder valve, the yoke having fastening means including a cut-out shaped to fit the back body and holes tapped into the back body for receiving screws for securing the yoke to the back body.

The chlorinator may additionally include in the chlorine inlet a chlorine filter, and a second valve seat in the diaphragm assembly disposed at a point of engagement of the detachable valve head with the diaphragm assembly, an aperture through the diaphragm assembly aligned with the second valve seat for providing a vent opening from the back chamber to the front chamber.

Further objects and advantages of this invention will be apparent from the following detailed description of a presently preferred embodiment which is illustrated schematically in the accompanying drawings.

BRIEF DESCRIPTION OF THE FIGURES

FIG. 2 is an elevational cross-sectional view of the invention showing its major components;

FIG. 3 is an elevational cross-sectional detail view of the invention showing a housing with a clamping ring;

FIG. 11 is an elevational cross-sectional view seen along the line A—A of FIG. 12 showing the clamping yoke;

FIG. 12 is an end view showing the clamping yoke seen along the line B—B of FIG. 11; and FIG. 13 is a cross-sectional fragmentary detail view showing details of the valve structure.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
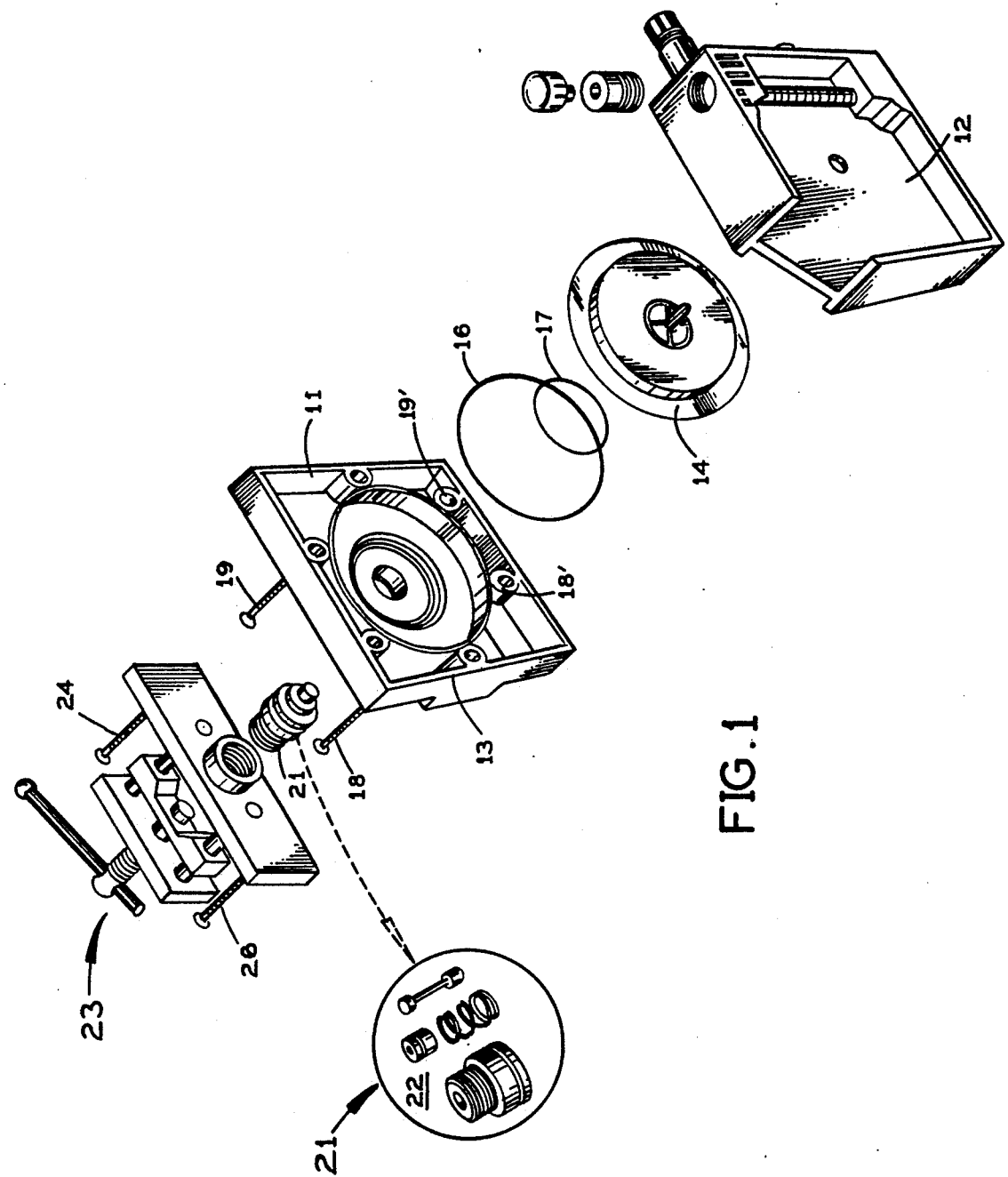
FIG. 1 is an exploded view of the prior art.

In FIG. 1, showing the prior art of a gas chlorinator/sulfonator, the device is formed of two body parts, a back body 11 and a front body 12 both parts being molded and joined along a seam 13 which requires a seal, such as O-rings or gaskets, to seal the seam. A diaphragm assembly 14 fits in recesses in the two body parts and requires further sealing parts in the form of O-rings 16, 17 to avoid leakage of gas around the diaphragm assembly. The two body parts 11, 12 are held together by screws 18, 19, 26, 24, and further two screws complementary to screws 18, 19, but not seen in FIG. 1, but indicated by their screw holes 18' and 19', that screw into threaded inserts (not shown) in the front body part 12. A valve and filter assembly 21 is shown separately and disassembled in detail sketch 22, and fits in a matching cavity in the back body and requires additional sealing components.

An assembly 23 of components serves to attach the chlorinator to a chlorine cylinder and requires further screws 24, 26 for attachment to the chlorinator.

As seen from FIG. 1 the prior art chlorinator has a complex construction and requires a considerable number of parts that must be assembled in order to provide the final component.

It is accordingly a primary object of the invention to provide a chlorinator that is simpler in construction and requires fewer parts.

FIG. 2 is a cross-section of the chlorinator according to the invention, which is composed of a circular back body 31 joined by threads 32 to a matching circular front body 33. A diaphragm assembly 34 is composed of a diaphragm 36 in the form of a circular disc of flexible plastic material having a circular perimeter flange 37 that is clamped firmly between two oppositely facing inside shoulders 38, 39 of the front and back bodies 31, 33.

A sealing O-ring 41 is inserted in a groove 40 in the shoulder 39 of the back body 31 to prevent gas from leaking around the perimeter flange 37 of the diaphragm. The center part of the diaphragm 36 is clamped between a first diaphragm plate 42 and a second diaphragm plate 43, having a threaded opening into which a threaded extension 46 with threads 44 of the first diaphragm plate 42 is threadedly inserted. It follows that the diaphragm 36 must have a central circular opening through which the threaded extension 46 is passed. Another sealing O-ring 47 is inserted in a circular groove surrounding the central circular opening in the diaphragm 36. The back and front bodies 31, 33 form an interior cavity divided into a back chamber 48 and a front chamber 49 by the diaphragm assembly 34, which are gas-tightly sealed from each other by O-rings 40,47. It follows that the diaphragm assembly 34 can move axially back and forth in the interior cavity in response to pressure differences between the front and back chambers 48,49.

A chlorine flow valve shown generally at 51 is positioned in a chlorine inlet 50 connecting the back chamber 48 with an external chlorine source connected to the mouth 52 of the chlorine inlet 50. The chlorine source is typically a chlorine gas cylinder having a neck fitting inserted in the loop formed by a rectangular yoke 53 having holes for admitting mounting screws 57 screwed into the back body 31. The flow valve 51, shown in more detail in FIG. 13 has an outer valve head 58 seated in a first valve seat 59 and a valve stem 61 connected at its other end with a detachable inner valve head 62 threadedly attached to the valve stem 61. The flow valve 51 is spring biased inward with its outer valve head 58 urged against the first valve seat 59 by means of a coil spring 63 resting with its upper end against a flange 64 intruding slightly into the gas inlet 50 and with its lower end pressing against a washer 66 abutting the inner valve head 62.

In its quiescent closed state the upper valve head 58 is seated against valve seat 59, and no gas is flowing into the chlorinator. In this state the inner valve head 62 rests lightly against a second inner valve seat 67 as shown in FIG. 2. In FIG. 13 the inner valve seat 67 is shown open as explained in more detail below. A permanent filter 68 is located at the mouth 52 of the gas inlet 50 to prevent contaminating solid particles from entering the interior of the chlorinator.

Figure 4:
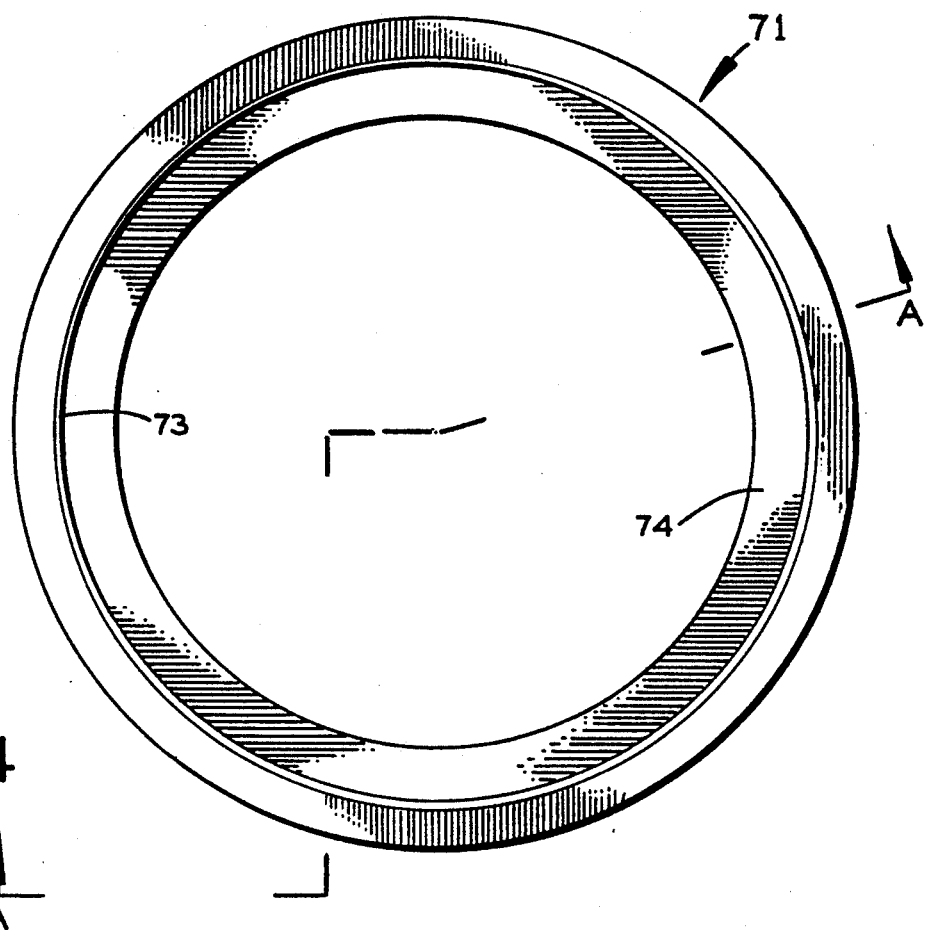
FIG. 4 is a plan view showing the clamping ring.
Figure 5:
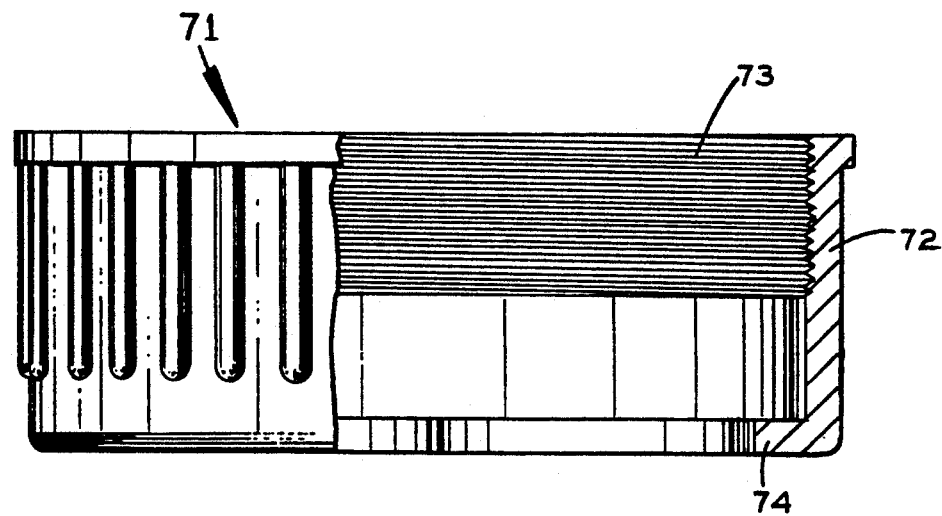
FIG. 5 is an elevational cross-sectional view of the clamping ring seen along the line A—A of FIG. 4.

FIG. 3 shows another variation of the body of the chlorinator, wherein a forward body 69 is clamped to the back body 31 by means of a clamping ring 71 seen in more detail in FIGS. 4 and 5. The clamping ring 71 has an axially extending flange 72 with inside threads 73 that match the outside threads 32 of the back body 31, and a radially inward projecting flange 74 that serves to clamp the front body 69 against the back body 31 by tightening the clamping ring 71.

Figure 9:
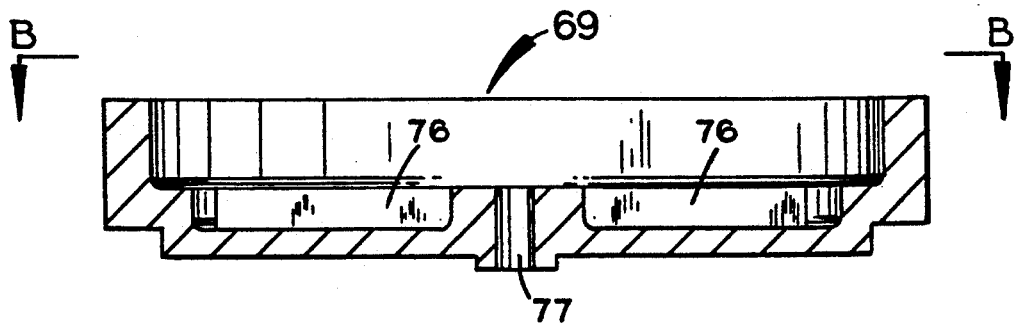
FIG. 9 is an elevational cross-sectional view seen along the line A—A of FIG. 10 of the back body.
Figure 10:
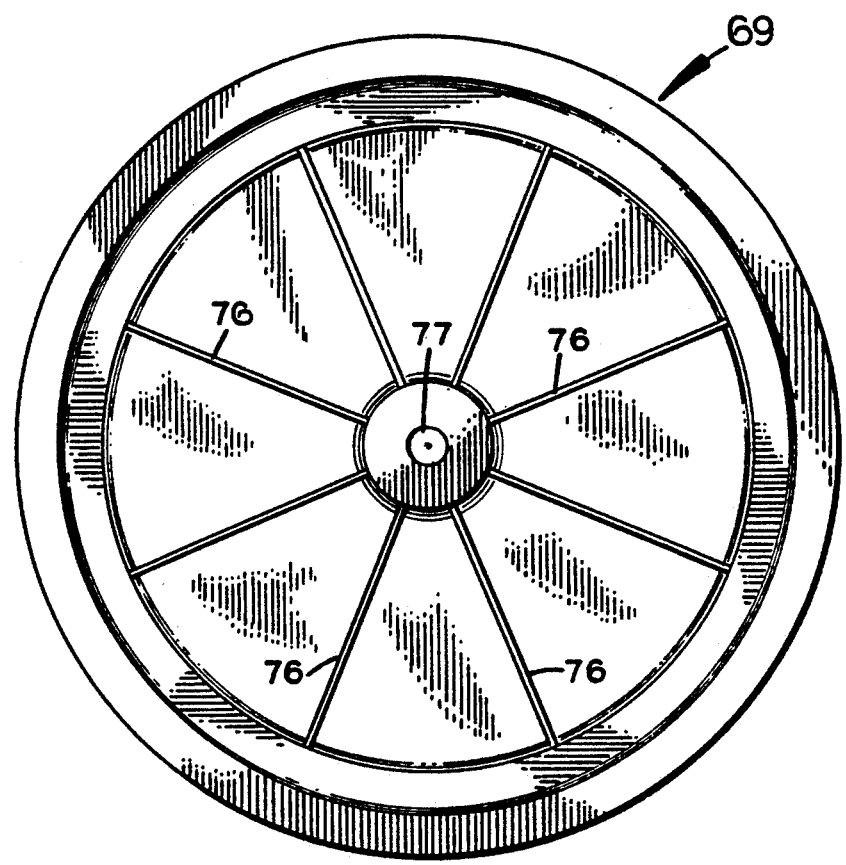
FIG. 10 is a plan view seen along the line B—B of FIG. 9.

The forward body 69 is shown in more detail in FIGS. 9 and 10, which show a circular body 69 with reinforcing radial ribs 76 and a central hole 77 for containing an indicator 78 (FIG. 2) for visually indicating the position of the diaphragm assembly 34.

Figure 7:
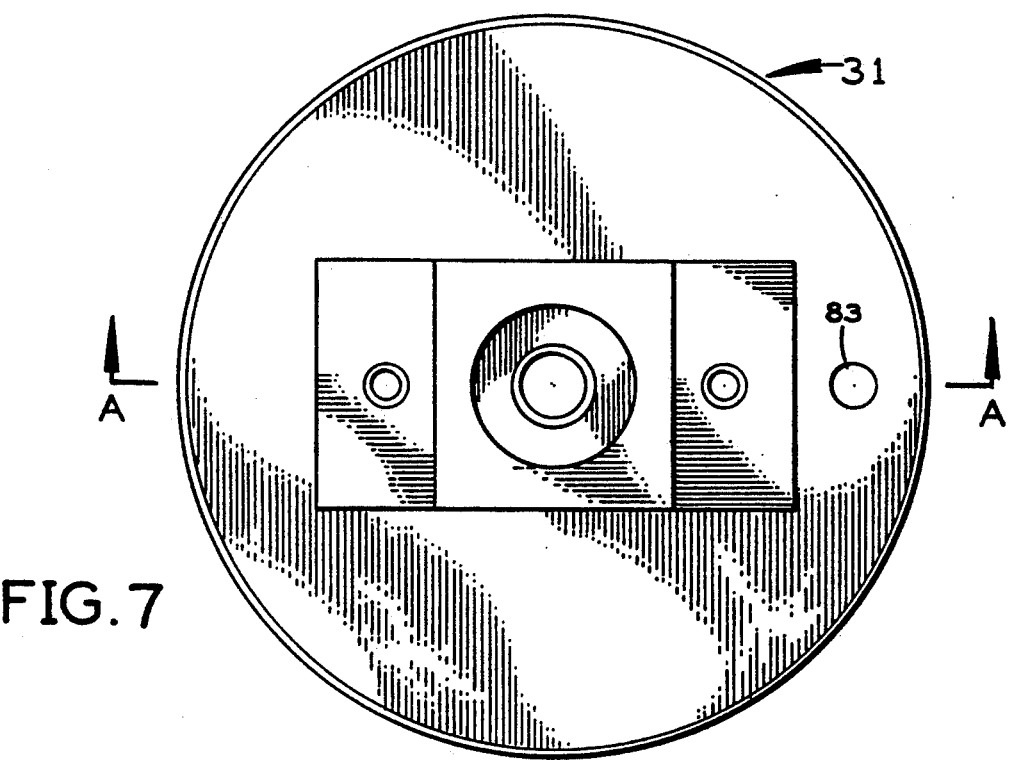
FIG. 7 is a plan view seen along the line 7—7 of FIG. 6 showing details of the back body.
Figure 8:
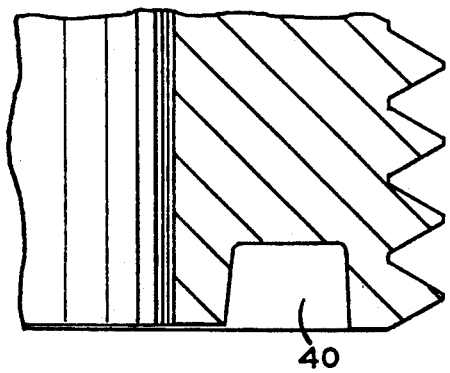
FIG. 8 is a cross-sectional fragmentary enlarged detail view showing a groove for holding a sealing O-ring.
Figure 6:
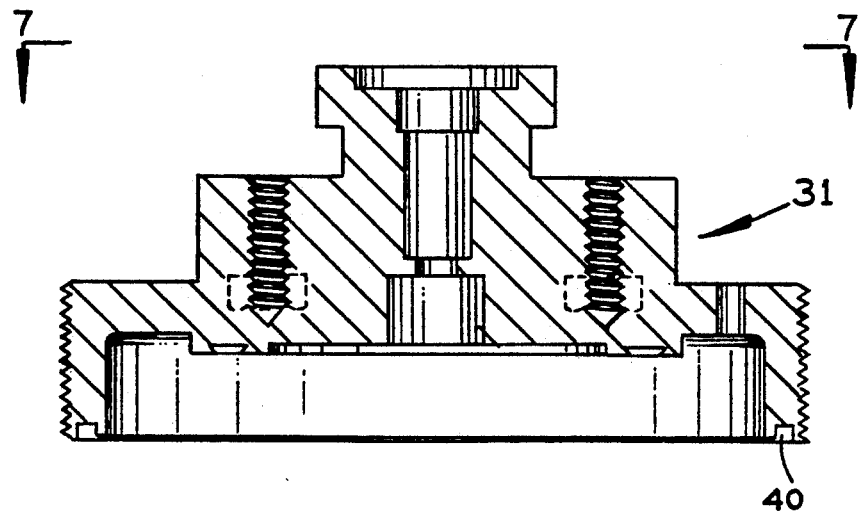
FIG. 6 is an elevational cross-sectional view seen along the line A—A of FIG. 7 showing the back body.

FIGS. 11 and 12 show details of the one-piece rectangular yoke 53 having a cut-out 56 shaped to fit the back body and having screw holes 79 for admitting screws 57 for securing the yoke 53 to the back body 31. As seen in FIG. 3, threaded inserts 81 can be molded into the back body 31 to receive the screws 57. The back body 31 may further have slots 82 (FIG. 3) for receiving the inner edges of cut-out 56 to further secure the yoke 53 to the back body 31. Returning now to FIG. 7 which shows the back body 31 seen from the rear of the chlorinator, and further shows a gas outlet opening 83 with female pipe threads for attachment of a gas outlet fitting leading to the user component of the chlorine gas. This gas outlet fitting (not shown) communicates with the back chamber 48 of the chlorinator. The user component is typically a venturi traversed by the fluid, usually water, to be treated with the chlorine gas. The venturi 83a creates a vacuum that is transmitted via the gas line and gas outlet 83 to the back chamber 48 and exerts a backward directed pull on the diaphragm assembly 34 (FIG. 2). The diaphragm assembly in turn acts on the valve 51, lifting the outer valve head 58 from the first valve seat 59, admitting the chlorine gas to the venturi via the back chamber 48, the gas outlet 83 (FIG. 7) and the gas line, not shown. If the water flow in the venturi stops, the vacuum disappears, and the flow valve 51 returns to normal, stopping the flow of gas.

According to a further feature, in case of gas leakage between the valve head 58 and valve seat 59 when in the normally closed position, a pressure can inadvertently build up in the back chamber 48, which will move the diaphragm assembly forward, away from the valve 51, as shown in FIG. 13, causing the inner valve head 62 to unseat from the inner valve seat 67, allowing the pressure build-up to be relieved to the forward chamber 49 via relief channel 86. In this case the front chamber will have a vent opening for venting the pressure build-up.

I claim:

1. A gas chlorinator comprising a chlorinator housing consisting of a front and a back body forming an interior cavity, a diaphragm assembly disposed between said front and back body dividing said cavity into a front chamber and a back chamber, a chlorine inlet passage in said back body connecting said back chamber with a chlorine source, a chlorine flow valve in said inlet passage in operative engagement with said diaphragm assembly for controlling flow of chlorine into said back chamber, a chlorine outlet connecting said back chamber with a vacuum source for activating said diaphragm assembly to supply chlorine to said vacuum source via said chlorine inlet and said flow valve; further including matching screw threads formed in said front and back body for threadedly joining said front and back body; opposite facing shoulders respectively formed in said front and back body, said diaphragm assembly including a diaphragm having a perimeter flange clamped between said opposite facing shoulders; a first groove formed in the one of the shoulders formed in said back body, a first O-ring disposed in said first groove for gastightly sealing said back chamber; including in said diaphragm assembly a first and second opposite diaphragm plate disposed on opposite sides of said diaphragm, and screw thread means between said first and second diaphragm plate for threadedly joining said diaphragm plates, clamping the diaphragm between said diaphragm plates; wherein said first diaphragm plate is disposed in said back chamber, and said second diaphragm plate is disposed in said front chamber, a hole is formed in said diaphragm, including in said screw thread means a threaded extension extending from one diaphragm plate through the hole in the diaphragm into a matching threaded hole in the other diaphragm plate; and wherein said first diaphragm plate has a forward facing groove facing said second diaphragm plate, and a second O-ring disposed in said forward facing groove for sealing said back chamber.

2. A gas chlorinator comprising a chlorinator housing consisting of a front and a back body forming an interior cavity, a diaphragm assembly disposed between said front and back body dividing said cavity into a front chamber and a back chamber, a chlorine inlet passage in said back body connecting said back chamber with a chlorine source, a chlorine flow valve in said inlet passage in operative engagement with said diaphragm assembly for controlling flow of chlorine into said back chamber, a chlorine outlet connecting said back chamber with a vacuum source for activating said diaphragm assembly to supply chlorine to said vacuum source via said chlorine inlet and said flow valve; further including a clamping ring having an axially extending flange having inside screw threads formed therein, and a radially inward extending flange, said back body having outside screw threads matching said inside screw threads in said clamping ring for threadedly clamping said back body to said front body; including in said chlorine flow valve a valve stem, a fixed valve head connected to one end of said valve stem, a detachable valve head releasably attached to the other end of said valve stem, a valve washer on said valve stem, a helical compression spring on said valve having a distal end urging said valve washer against said detachable valve head and a rear end, a backward facing first valve seat in said chlorine inlet in engagement with said fixed valve head, an inside flange in said chlorine inlet having an inward facing flange in engagement with said near end of said compression spring for urging said fixed valve head against said backward facing first valve seat.

3. A gas chlorinator comprising a chlorinator housing consisting of a front and a back body forming an interior cavity, a diaphragm assembly disposed between said front and back body dividing said cavity into front chamber and a back chamber, a chlorine inlet passage in said back body connecting said back chamber with a chlorine source, a chlorine flow valve in said inlet passage in operative engagement with said diaphragm assembly for controlling flow of chlorine into said back chamber, a chlorine outlet connecting said back chamber with a vacuum source for activating said diaphragm assembly to supply chlorine to said vacuum source via said chlorine inlet and said flow valve; further comprising matching screw threads formed in said front and back body for threadedly joining said front and back body, a rectangular yoke for securing said chlorinator to a chlorine cylinder, said yoke extending perpendicularly away from said back body, the yoke having a cut-out shaped to fit said back body, and fastening means comprising two screws threadedly inserted into said back body for attaching said yoke to said back body.

4. A gas chlorinator comprising a chlorinator housing consisting of a front and a back body forming an interior cavity, a diaphragm assembly disposed between said front and back body dividing said cavity into a front chamber and a back chamber, a chlorine inlet passage in said back body connecting said back chamber with a chlorine source, a chlorine flow valve in said inlet passage in operative engagement with said diaphragm assembly for controlling flow of chlorine into said back chamber, a chlorine outlet connecting said back chamber with a vacuum source for activating said diaphragm assembly to supply chlorine to said vacuum source via said chlorine inlet and said flow valve; further including a rectangular yoke for securing said chlorinator to a chlorine cylinder, said yoke extending perpendicularly away from said back body, the yoke having a cut-out shaped to fit said back body, and fastening means for attaching said yoke to said back body; wherein said fastening means include holes for receiving screws tapped into said back body for securing said yoke to said back body.

5. A chlorinator according to claim 4, including in said chlorine inlet a chlorine filter.

6. A chlorinator according to claim 2, including a second valve seat in said diaphragm assembly disposed at a point of engagement of said detachable valve head with said diaphragm assembly, and an aperture through said diaphragm assembly aligned with said second valve seat for providing a vent opening from said back chamber to said front chamber.

* * * * *